United States Patent
Fornof

(10) Patent No.: US 6,883,321 B2
(45) Date of Patent: Apr. 26, 2005

(54) FILTER ASSEMBLY FOR EXHAUST GASES

(75) Inventor: William P. Fornof, Girard, PA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/423,080

(22) Filed: Apr. 25, 2003

(65) Prior Publication Data

US 2004/0211181 A1 Oct. 28, 2004

(51) Int. Cl.[7] .......................... F02B 33/44; F02B 37/00; B01D 46/24
(52) U.S. Cl. ............. 60/605.2; 123/198 E; 123/568.11; 55/520; 55/522
(58) Field of Search ..................... 60/605.2; 123/198 E; 55/385.3, DIG. 30, DIG. 28, 498, 522, 521, 523

(56) References Cited

U.S. PATENT DOCUMENTS

| | | | |
|---|---|---|---|
| 3,826,067 A | * 7/1974 | Wilder et al. | 55/498 |
| 3,876,400 A | * 4/1975 | Frantz | 55/522 |
| 3,877,451 A | * 4/1975 | Lipscomb | 123/573 |
| 4,082,071 A | * 4/1978 | Jones | 123/573 |
| 4,265,647 A | * 5/1981 | Donachiue | 55/385.3 |
| 4,271,977 A | * 6/1981 | Saigne | 55/523 |
| 4,329,162 A | 5/1982 | Pitcher, Jr. | |
| 5,100,632 A | 3/1992 | Dettling et al. | |
| 5,261,946 A | * 11/1993 | Overby | 55/282.2 |
| 5,458,666 A | * 10/1995 | Miyakata | 55/498 |
| 5,494,020 A | * 2/1996 | Meng | 123/568.11 |
| 5,551,971 A | 9/1996 | Chadderton et al. | |
| 5,564,401 A | * 10/1996 | Dickson | 123/573 |
| 5,785,030 A | * 7/1998 | Paas | 60/605.2 |
| 5,803,024 A | * 9/1998 | Brown | 123/198 E |
| 5,927,075 A | 7/1999 | Khair | |
| 6,003,316 A | 12/1999 | Baert et al. | |
| 6,098,575 A | * 8/2000 | Mulshine et al. | 123/198 E |
| 6,187,073 B1 | * 2/2001 | Gieseke et al. | 123/198 E |
| 6,301,887 B1 | 10/2001 | Gorel et al. | |
| 6,530,969 B2 | * 3/2003 | Gieseke et al. | 123/198 E |
| 6,599,342 B2 | * 7/2003 | Andress et al. | 123/198 E |
| 6,602,308 B1 | * 8/2003 | Carle et al. | 123/198 E |

FOREIGN PATENT DOCUMENTS

| | | | | |
|---|---|---|---|---|
| JP | 07238870 A | * | 9/1995 | F02B/37/00 |
| WO | WO 9852676 A1 | * | 11/1998 | B01D/46/24 |

* cited by examiner

Primary Examiner—Thai-Ba Trieu
(74) Attorney, Agent, or Firm—Calfee, Halter & Griswold LLP

(57) ABSTRACT

An in-line filter assembly for filtering engine exhaust gases utilized by turbocharged internal combustion engine systems. The filter assembly includes an external housing having a lower housing section and an upper housing section. The upper housing section further includes an air inlet port and an air outlet port. A filter unit for decontaminating the exhaust stream is positioned below the air inlet port. An interior chamber is in communication with the outlet port and surrounds the filter unit. A spring positioned directly beneath the filter unit stabilizes the filter unit within the chamber and urges the filter unit upward into sealing engagement with the inlet port. The lower housing section also includes a sump for collecting contaminants captured by the filter unit.

15 Claims, 3 Drawing Sheets

FILTER ASSEMBLY FOR EXHAUST GASES

TECHNICAL FIELD OF THE INVENTION

The present invention relates in general to filtration devices for automotive applications, and more specifically to a filtration assembly for removing liquid and solid contaminants from exhaust gases in a turbocharged air stream that is used to cool the bearing of the turbocharger.

BACKGROUND OF THE INVENTION

An internal combustion engine requires oxygen for the fuel utilized by the engine to be effectively combusted. Oxygen is typically supplied to such engines by drawing ambient air from the external environment into the engine. While the air drawn into the engine provides the necessary oxygen, ambient air also contains a large quantity of nitrogen. The high temperatures generated by internal combustion engines cause this nitrogen to react with any unused oxygen and results in the formation of nitrogen oxides [$NO_X$], which are considered to be one of the main environmental pollutants emitted by vehicle engines.

Exhaust gas recirculation (EGR) was developed as a means for reducing $NO_X$ emissions by recycling a portion of the exhaust gases generated by a vehicle's engine back into the air intake of the engine. Exhaust gases contain much less oxygen than ambient air and by mixing the exhaust gases with fresh air drawn into the engine, the overall oxygen consumption of the engine is reduced. Providing the engine with less oxygen decreases the combustion temperature and, consequently, reduces the amount of pollutants emitted by the vehicle.

The inclusion of turbochargers in the engine systems of vehicles such as diesel cars and trucks is commonplace. More recently developed turbochargers include bearings that do not require external lubrication i.e., oil. Such bearings typically include a polymeric surface coating that can be damaged or degraded by physical contact with oil or other hydrocarbons. Degradation of this polymeric surface decreases the performance and effectiveness of such bearings and can reduce the overall performance and longevity of the turbocharger.

Oil in the form of an aerosol and/or vapor, as well as solid particulate matter, is often found in the exhaust gases generated by internal combustion engines. Thus, in vehicles that utilize both exhaust gas recirculation systems and turbochargers with oil-free bearings, the possibility exists that certain contaminants present in the re-circulated exhaust gases can damage the turbocharger's bearings. Therefore, the need exists for a filtration device that will safely and effectively remove oil aerosols and other contaminants from exhaust gases re-circulated to a turbocharger that is included as part of a vehicle's engine system.

SUMMARY OF THE INVENTION

The present invention provides a filter assembly for filtering engine exhaust utilized by exhaust gas recirculation systems installed in turbocharged internal combustion engine systems. This filter assembly is mounted in-line in a vehicle's turbocharger bearing cooling system and removes hydrocarbon aerosols, vapors, and particulate matter that is potentially damaging to the bearings used in certain turbochargers.

An exemplary embodiment of this invention includes an external housing having a lower housing section and an upper housing section. These sections are typically permanently attached to one another by adhesive means, but are detachable from one another in certain embodiments. The upper housing section further includes an air inlet port for allowing the exhaust stream to enter the filter assembly and an air outlet port for allowing the exhaust stream to exit the filter unit. A filter unit for decontaminating the exhaust stream is positioned below the air inlet port. In an exemplary embodiment, the filter unit includes a micro-glass fiber filter element for filtering the exhaust gas, and a means for providing structural support to the micro-glass fibers. Other filter media are compatible with the filter unit of the present invention. An interior chamber is in communication with the outlet port and surrounds the filter unit. Filter exhaust gases exit the filter unit, enter the chamber, and are expelled from the assembly through the air outlet port.

Additionally, an exemplary embodiment includes a spring positioned directly beneath the filter unit for stabilizing the filter unit within the chamber and for urging the filter unit upward into sealing engagement with the inlet port. The spring also serves as a bypass system that allows air to pass directly from the inlet port to the outlet port if the filter element becomes clogged or plugged. An end cap positioned directly beneath the filter unit and directly on top of the spring further stabilizes the filter unit within the housing. The lower housing section also includes a ring, indentation, or groove for stabilizing the spring within the housing while upper housing section further includes a collar formed around the base of the air inlet port for stabilizing the filter unit within the housing. The lower housing section also includes a sump for collecting contaminants captured by the filter unit.

Further advantages of the present invention will become apparent to those of ordinary skill in the art upon reading and understanding the following detailed description of the preferred embodiments.

BRIEF DESCRIPTION OF THE DRAWINGS

The accompanying drawings, which are incorporated into and form a part of the specification, schematically illustrate an exemplary embodiment of the invention and, together with the general description given above and detailed description of the preferred embodiments given below, serve to explain the principles of the invention.

DETAILED DESCRIPTION OF THE INVENTION

Reference Numerals

Figure 1:
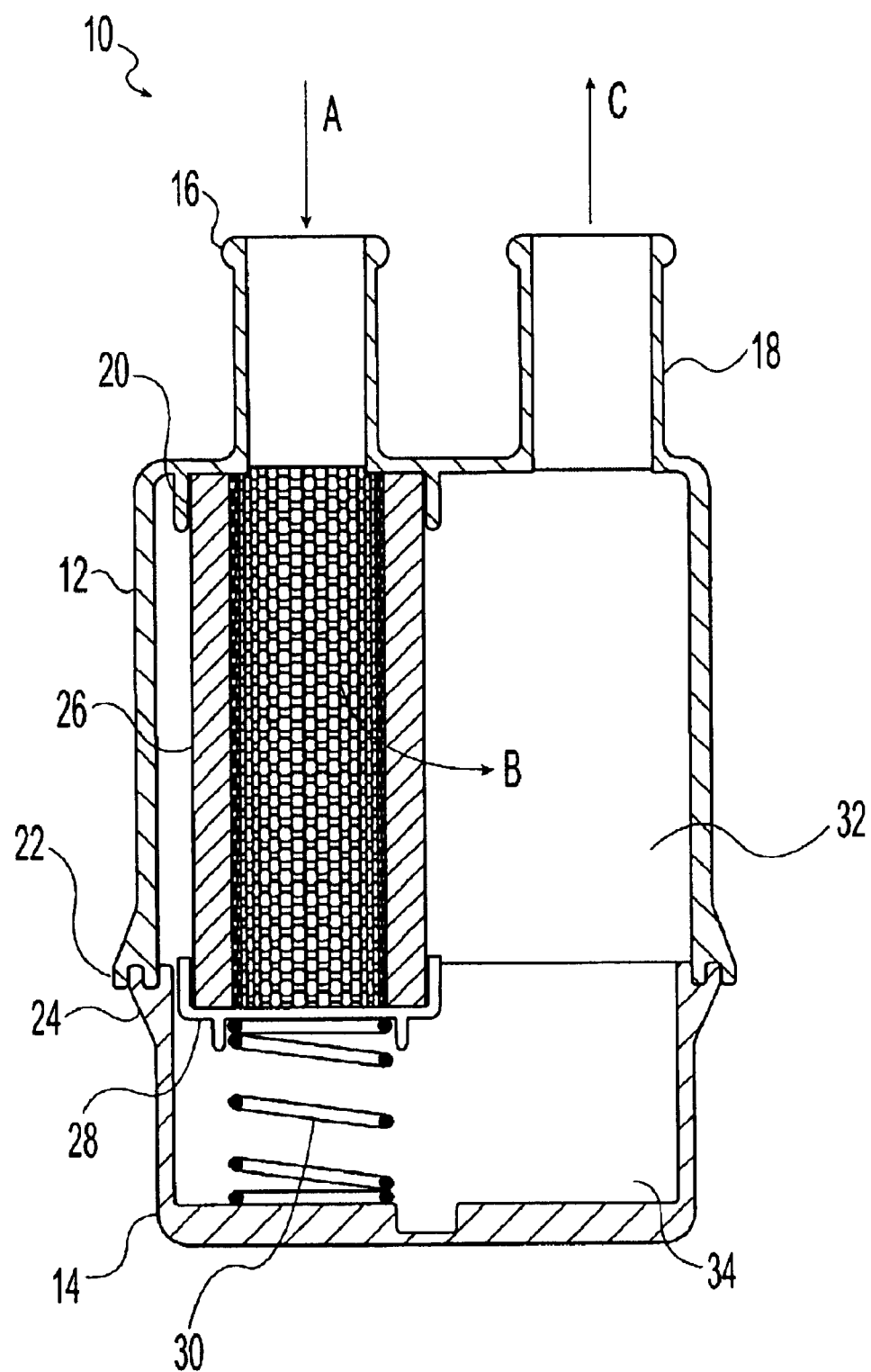
FIG. 1 is a cross-sectional side view of the filter assembly of the present invention showing the various internal components of the assembled device.
Figure 2:
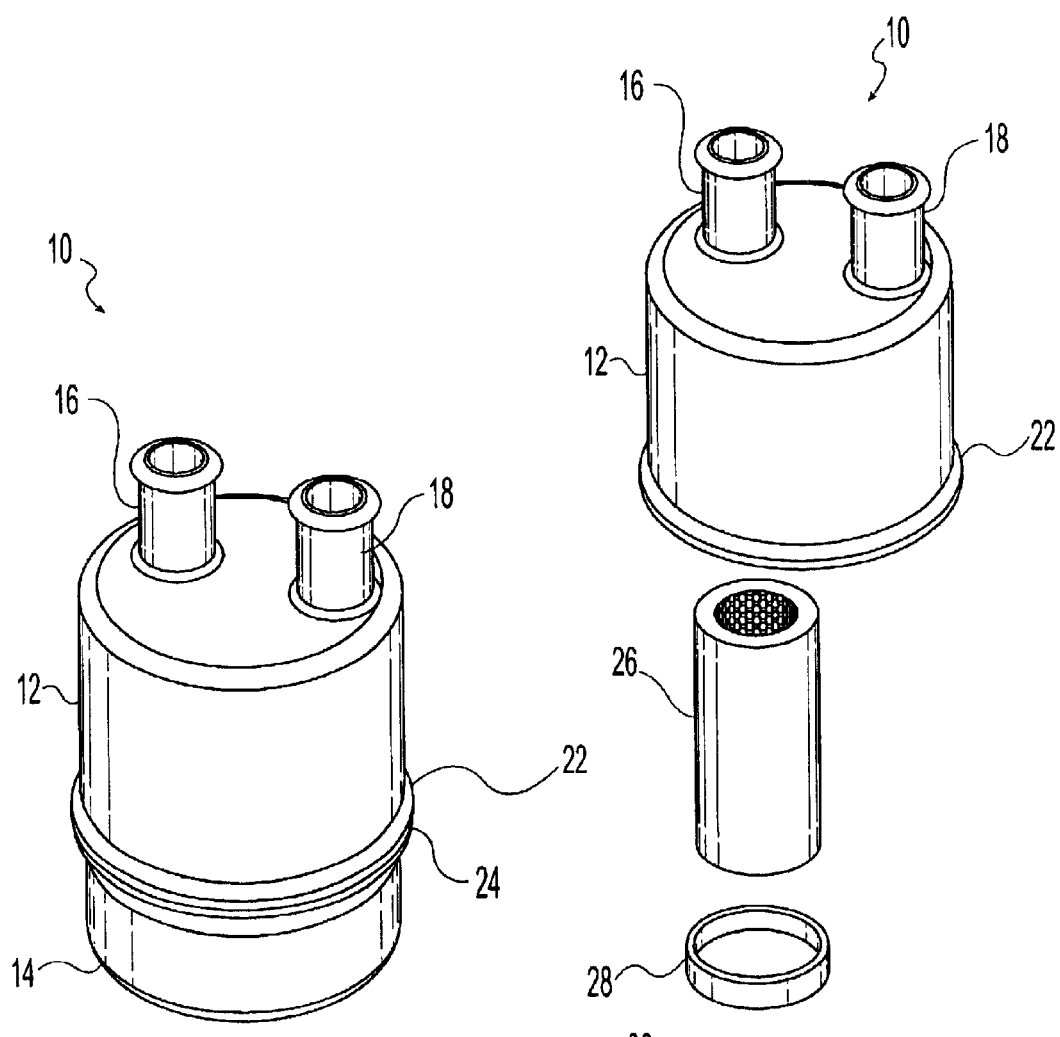
FIG. 2 is a perspective view of the filter assembly of the present invention showing the appearance of the assembled device.
Figure 3:
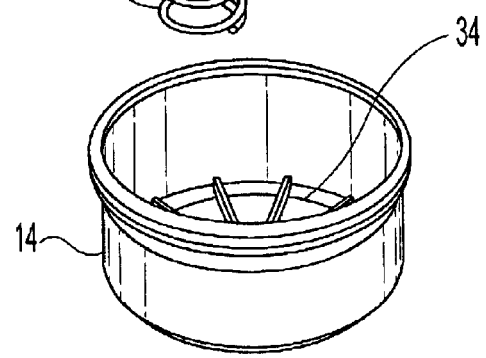
FIG. 3 is an exploded perspective view of the present invention showing the various component parts of the filter assembly.

10 filter assembly
12 upper housing section
14 lower housing section
16 inlet port 18 outlet port
20 collar
22 first joining member
24 second joining member
26 filter unit
28 end cap
30 spring
32 chamber
34 sump
50 engine system
52 air filter
54 turbocharger
56 compressor
58 turbine
60 intercooler
62 engine
64 intake manifold
66 combustion chambers
68 exhaust manifold
70 air bearing
72 EGR cooler
74 valve With reference to FIGS. 1-3, and according to an exemplary embodiment of the present invention, filter assembly 10 includes a substantially cylindrical external housing, a filter unit 26, and an internal support mechanism. The external housing component further includes an upper housing section 12 and a lower housing section 14 which are detachably connected at and by first joining member 22 and second joining member 24. Filter unit 26 resides within the housing of filter assembly 10 and is secured within chamber 32 by an internal support mechanism comprising collar 20, end-cap 28, and spring 30. In the exemplary embodiment shown in FIG. 1, collar 20 is formed integrally with upper housing section 12. Preferably, spring 30 sits in a ring, groove, indentation, or similar structure (not shown) in lower housing section 14 and provides pressure to end-cap 28 sufficient to keep filter unit 26 secured in-place within chamber 32. Although this placement of spring 30 is preferred, other placements of the spring are possible. In an alternate embodiment, spring 30 sits atop the filter unit and urges the filter unit downward into end-cap 28.

Figure 4:
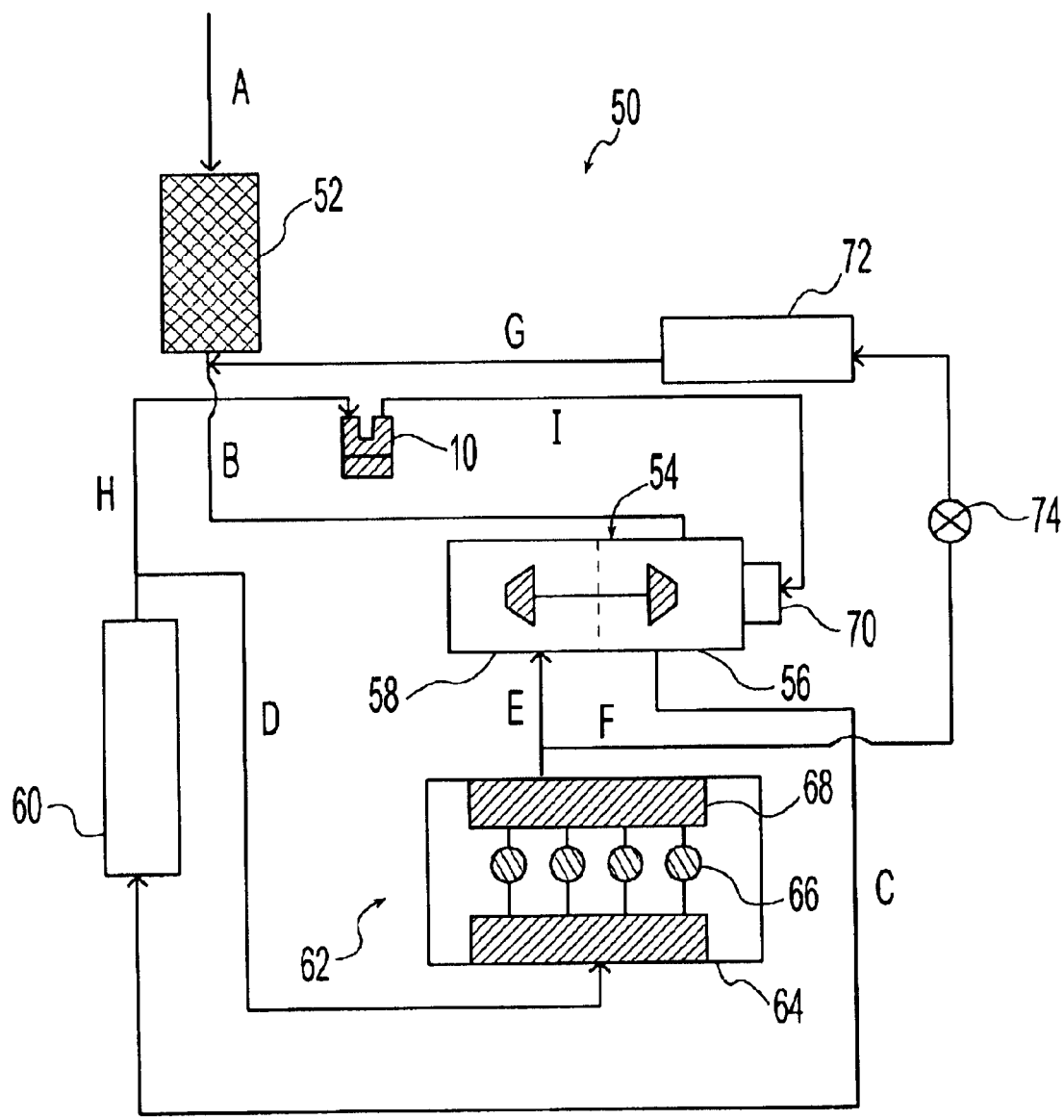
FIG. 4 is a schematic block diagram showing various components associated with an typical internal combustion engine, a typical exhaust gas recirculation system, and the filter assembly of the present invention.

As stated above, filter assembly 10 is designed for use with turbocharged internal combustion engines that utilize exhaust gas recirculation (EGR), which is a process known in the art for reducing dangerous engine emissions from vehicles. FIG. 4 shows filter assembly 10 installed in-line in a turbocharged diesel engine utilizing EGR. As will be appreciated by those skilled in the art, engine 50 comprises a number of engine components that are connected to one another by a series of ducts through which the air stream flows. FIG. 4 is a general schematic showing the placement of the present invention within the engine system and is not intended to show all of the components and subcomponents typical of internal combustion engines.

As illustrated in FIG. 4, the air required for combustion is drawn into engine system 50 through air filter 52 (arrow "A"). The filtered air stream then flows from air filter 52 into the compressor 56 of turbocharger 54 (arrow "B"), exits compressor 56, and flows to intercooler 60 (arrow "C"). Upon exiting intercooler 60, the air flow splits into two separate paths. A portion of the air flow (arrow "D") is directed to intake manifold 64 which forms part of engine 62. Intake manifold 64 directs the air to combustion chambers 66 where it is mixed with fuel and combusted. The products of combustion or "exhaust gases" exit combustion chambers 66 and enter exhaust manifold 68 which directs the exhaust gases out of engine 62 and into the turbine 58 of the turbocharger. Turbine 58 is also referred to in the art as a charger or supercharger. The exhaust gases flow through the line labeled as arrow E in FIG. 4, and a portion of said gasses is then directed through valve 74 into optional EGR cooler 72 (arrow "F"). After exiting optional EGR cooler (arrow "G") the gases recombine with the fresh air intake (arrow "B"). As also shown in FIG. 4, the portion of the airflow that does not flow toward engine 62 is directed toward filter assembly 10 (arrow "H"). After passing through filter assembly 10, this portion of the airflow is directed through air bearing 70 (arrow "I").

Recirculated exhaust gases contain a variety of contaminants including gaseous pollutants such as hydrocarbons, nitrogen oxides, carbon monoxide, as well as particulate matter. The particulate matter typically comprises both a dry, solid carbonaceous fraction and a soluble organic fraction which is present in the diesel exhaust as either a vapor phase or a liquid phase, or both. The exhaust also contains particles such as zinc and phosphate (resulting from lubricating oils), calcium, magnesium and silicates (resulting from engine coolant) and iron (resulting from engine wear) all of which combine to form exhaust ash. Any or all of these contaminants can potentially damage the turbine and its components because turbochargers that utilize oil-less bearings with polymeric surfaces are particularly susceptible to damage by such contaminants, especially hydrocarbons.

To remove the potentially damaging contaminants from re-circulated exhaust gases, filter assembly 10 is mounted in-line between intercooler 60 and air bearing 70. Gases enter filter assembly 10 through inlet port 16 (see FIGS. 1-3) and pass through filter unit 26. In an exemplary embodiment, filter unit 26 is a coalescing filter comprising a substantially tube-shaped filter element made from fine micro-glass fiber. Filter unit 26 traps particulate matter directly within its matrix and causes aerosols to agglomerate or "coalesce" on the surface of the filter material. As the aerosols coalesce on the filter element, droplets of oil or other substances eventually form and become heavy enough to drop off of filter unit 26 and fall into sump 34 where they are retained for the period filter assembly 10 is in operation. Once the contaminants have entered sump 34, they are effectively prevented from re-entering the exhaust air stream.

Exhaust gases exit the filter unit and enter chamber 32 which surrounds filter unit 26. As shown in FIG. 1, the exemplary embodiment includes a chamber 32 that is physically larger than the portion of the interior of filter assembly 10 occupied by filter unit 26. In other embodiments of this invention, filter unit 26 and chamber 32 are symmetrical with respect to one another such that if viewed in cross section, both halves of the interior of filter assembly 10 would appear substantially equal in size. Other spatial configurations may be utilized without diminishing the effectiveness of the filter unit.

In the event that filter unit 26 becomes blocked or other inoperative in a manner that prevents the exhaust gases from passing through the filter, spring 30 provides a bypass mechanism that allows the gases to pass through filter assembly 10 unfiltered. In normal operation, spring 30 is axially interposed between lower housing section 14 and end cap 28 to urge filter unit 26 upward, or into sealing engagement with collar 20. If a restriction or blockage occurs in filter unit 26, air pressure will build in inlet port 16 and urge the entire filter unit downwardly to compress spring 30. This movement of the filter unit establishes a bypass passage allowing inlet port 16 to communicate directly with outlet port 18 by way of chamber 32. In this manner the inlet port and outlet port are in communication without proceeding through filter unit 26. In an exemplary embodiment, spring 30 exerts of force of approximately twenty-five (25) pounds; however, this force is exemplary and is should not be construed in a limiting sense.

The outer housing of filter assembly 10 may be manufactured from plastic, polymer, metals such as steel or aluminum, or any other sufficiently rigid material. In one embodiment, upper housing section 12 and lower housing section 14 are glued or otherwise permanently affixed to one another resulting in a filter assembly may be removed and disposed of after it has reached the end of its useful life. In another embodiment, the two housing sections are detachably held together by snap means or other means of attachment resulting in a filter assembly that may be removed, opened, cleaned and/or re-conditioned with replacement parts, and re-installed in the vehicle's EGR system.

While the above description contains many specificities, these should not be construed as limitations on the scope of the invention, but rather as exemplification of preferred embodiments. Numerous other variations of the present invention are possible, and is not intended herein to mention all of the possible equivalent forms or ramifications of this invention. Various changes may be made to the present invention without departing from the scope of the invention.

What is claimed:

1. An exhaust gas filtration system for turbocharged internal combustion engines, comprising:
   (a) a turbocharger, wherein said turbocharger utilizes exhaust gas generated by said internal combustion engines; and
   (b) a filtration assembly in communication with said turbocharger for reducing contaminants in said exhaust gas, and wherein said filtration assembly further comprises:
      (i) a housing, said housing further comprising an exhaust gas inlet port and an exhaust gas outlet port in the top portion of said housing, and a sump in the bottom portion of said housing;
      (ii) a filter unit in communication with said exhaust gas, said filter unit further comprising a coalescing filter;
      (iii) a spring directly beneath said filter unit for stabilizing said filter unit within said chamber, and for urging said filter unit upward into sealing engagement with said inlet port; and
      (iv) a chamber on the interior of said housing in communication with said filter unit and said exhaust gas outlet port, and wherein said filter unit is offset from the central axis of said chamber.

2. The exhaust gas filtration system of claim 1, wherein said upper housing portion is detachable from the lower housing portion.

3. The exhaust gas filtration system of claim 1, wherein said filter unit further comprises:
   (a) micro-glass fibers for filtering said exhaust gas; and
   (b) a support means for providing structural support to said micro-glass fibers.

4. An exhaust gas filtration system for turbocharged internal combustion engines, comprising:
   (a) a turbocharger, wherein said turbocharger utilizes exhaust gas generated by said internal combustion engines; and
   (b) a filtration assembly in communication with said turbocharger for reducing contaminants in said exhaust gas, and wherein said filtration assembly further comprises:
      i) a housing, said housing further comprising an exhaust gas inlet port and an exhaust gas outlet port in the top portion of said housing, and a sump in the bottom portion of said housing;
      (ii) a filter unit in communication with said exhaust gas, said filter unit further comprising a coalescing filter;
      (iii) a spring directly beneath said filter unit for stabilizing said filter unit within said chamber, and for urging said filter unit upward into sealing engagement with said inlet port;
      (iv) an end cap directly beneath said filter unit and directly on top of said spring for stabilizing said filter unit within said housing; and
      (v) a chamber on the interior of said housing in communication with said filter unit and said exhaust gas outlet ports and wherein said filter unit is offset from the central axis of said chamber.

5. An exhaust gas filtration system for turbocharged internal combustion engines, comprising:
   (a) a turbocharger, wherein said turbocharger utilizes exhaust gas generated by said internal combustion engines; and
   (b) a filtration assembly in communication with said turbocharger for reducing contaminants in said exhaust gas, and wherein said filtration assembly further comprises:
      (i) a housing, said housing further comprising an exhaust gas inlet port and an exhaust gas outlet port in the top portion of said housing, and a sump in the bottom portion of said housing;
      (ii) a filter unit in communication with said exhaust gas, said filter unit further comprising a coalescing filter;
      (iii) a collar formed around the base of said exhaust gas inlet port for stabilizing said filter unit within said housing; and
      (iv) a chamber on the interior of said housing in communication with said filter unit and said exhaust gas outlet port, and wherein said filter unit is offset from the central axis of said chamber.

6. A filter assembly for filtering engine exhaust gases utilized by turbocharged internal combustion engines, comprising:
   (a) a housing, said housing further comprising a lower housing section and an upper housing section, said upper housing section further comprising an exhaust gas inlet port and an exhaust gas outlet port, and said lower housing section further comprising a sump;
   (b) a filter unit positioned below said exhaust gas inlet port and in communication with said exhaust gas inlet port said filter unit further comprising a coalescing filter;
   (c) a chamber on the interior of said housing and surrounding said filter unit, and wherein said chamber is in communication with said filter unit and said exhaust gas outlet port, and wherein the physical space occupied by said filter unit is small relative to the total interior space of said chamber; and
   (d) a spring directly beneath said filter unit for stabilizing said filter unit within said chamber, and for urging said filter unit upward into sealing engagement with said exhaust gas inlet port.

7. The filter assembly of claim 6, wherein said lower housing section further comprises a ring, indentation, or groove for stabilizing said spring within said housing.

8. The filter assembly of claim 6, wherein said filter unit further comprises:

(a) a micro-glass fibers for filtering said exhaust gas; and
(b) a support means for providing structural support to said micro-glass fibers.

9. A filter assembly for filtering engine exhaust gases utilized by turbocharged internal combustion engines, comprising:
(a) a housing, said housing further comprising a lower housing section and an upper housing section, said upper housing section further comprising an exhaust gas inlet port and an exhaust gas outlet port, and said lower housing section further comprising a sump;
(b) a filter unit positioned below said exhaust gas inlet port and in communication with said exhaust gas inlet port said filter unit further comprising a coalescing filter;
(c) a chamber on the interior of said housing and surrounding said filter unit, and wherein said chamber is in communication with said filter unit and said exhaust gas outlet port, and wherein the physical space occupied by said filter unit is small relative to the total interior space of said chamber;
(d) a spring directly beneath said filter unit for stabilizing said filter unit within said chamber, and for urging said filter unit upward into sealing engagement with said exhaust gas inlet port; and
(e) an end cap directly beneath said filter unit and directly on top of said spring for stabilizing said filter unit within said housing.

10. A filter assembly for filtering engine exhaust gases utilized by turbocharged internal combustion engines, comprising:
(a) a housing, said housing further comprising a lower housing section and an upper housing section, said upper housing section further comprising an exhaust gas inlet port and an exhaust gas outlet port, and said lower housing section further comprising a sump;
(b) a filter unit positioned below said exhaust gas inlet port and in communication with said exhaust gas inlet port said filter unit further comprising a coalescing filter;
(c) a collar formed around the base of said exhaust gas inlet port for stabilizing said filter unit within said housing; and
(d) a chamber on the interior of said housing and surrounding said filter unit, and wherein said chamber is in communication with said filter unit and said exhaust gas outlet port, and wherein the physical space occupied by said filter unit is small relative to the total interior space of said chamber.

11. A method for reducing contaminants in engine exhaust gases for recirculation through a turbocharger, comprising the steps of:
(a) directing said exhaust eases through a filter assembly, wherein said filter assembly is located immediately upstream from said turbocharger, and comprises:
(i) a housing, said housing further comprising a lower housing section and an upper housing section, said upper housing section further comprising an exhaust gas inlet port and an exhaust gas outlet port, and said lower housing section further comprising a sump;
(ii) a filter unit positioned below said exhaust gas inlet port and in communication with said exhaust gas inlet port, said filter unit further comprising a coalescing filter;
(iii) a chamber on the interior of said housing and surrounding said filter unit, and wherein said chamber is in communication with said filter unit and said exhaust pas outlet port, and wherein said filter unit is offset from the central axis of said chamber; and
(iv) a spring directly beneath said filter unit for stabilizing said filter unit within said chamber, and for urging said filter unit upward into sealing engagement with said exhaust gas inlet port; and
(b) directing said exhaust gases into said turbocharger.

12. The method of claim 11, wherein said wherein said lower housing section further comprises a ring, indentation, or groove for stabilizing said spring within said housing.

13. The method of claim 11, wherein said filter unit further comprises:
(a) micro-glass fibers for filtering said exhaust gas; and
(b) a support means for providing structural support to said micro-glass fibers.

14. A method for reducing contaminants in engine exhaust gases for recirculation through a turbocharger, comprising the steps of:
(a) directing said exhaust gases through a filter assembly, wherein said filter assembly is located immediately upstream from said turbocharger, and comprises:
(i) a housing, said housing further comprising a lower housing section and an upper housing section, said upper housing section further comprising an exhaust gas inlet port and an exhaust gas outlet port, and said lower housing section further comprising a sump;
(ii) a filter unit positioned below said exhaust gas inlet port and in communication with said exhaust gas inlet port, said filter unit further comprising a coalescing filter;
(iii) a chamber on the interior of said housing and surrounding said filter unit, and wherein said chamber is in communication with said filter unit and said exhaust gas outlet port, and wherein said filter unit is offset from the central axis of said chamber;
(iv) a spring directly beneath said filter unit for stabilizing said filter unit within said chamber, and for urging said filter unit upward into sealing engagement with said exhaust gas inlet port; and
(v) an end cap directly beneath said filter unit and directly on top of said spring for stabilizing said filter unit within said housing; and
(b) directing said exhaust gases into said turbocharger.

15. A method for reducing contaminants in engine exhaust gases for re-circulation through a turbocharger, comprising the steps of:
(a) directing said exhaust gases through a filter assembly, wherein said filter assemble is located immediately upstream from said turbocharger, and comprises:
(i) a housing, said housing further comprising a lower housing section and an upper housing section, said upper housing section further comprising an exhaust gas inlet port and an exhaust gas outlet port, and said lower housing section further comprising a sump;
(ii) a filter unit positioned below said exhaust gas inlet port and in communication with said exhaust gas inlet port, said filter unit further comprising a coalescing filter;
(iii) a collar formed around the base of said exhaust gas inlet port for stabilizing said filter unit within said housing; and
(iv) a chamber on the interior of said housing and surrounding said filter unit, and wherein said chamber is in communication with said filter unit and said exhaust gas outlet port, and wherein said filter unit is offset from the central axis of said chamber; and
(b) directing said exhaust gases into said turbocharger.

* * * * *